(Model.)
J. M. DODGE.
PROCESS OF AND APPARATUS FOR CONVEYING MATERIALS.
No. 545,013. Patented Aug. 20, 1895.
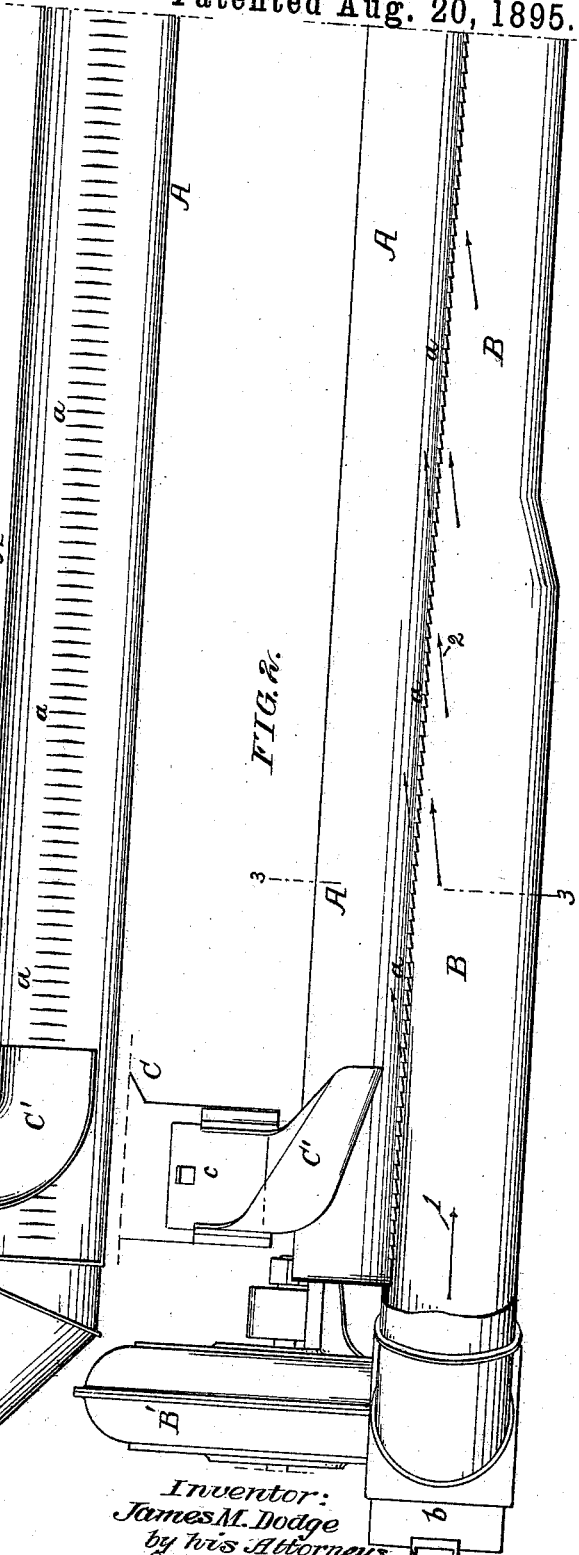
Inventor:
James M. Dodge
by his Attorneys
Howson & Howson (Model.)
J. M. DODGE.
PROCESS OF AND APPARATUS FOR CONVEYING MATERIALS.
No. 545,013. Patented Aug. 20, 1895.
2 Sheets—Sheet 2.
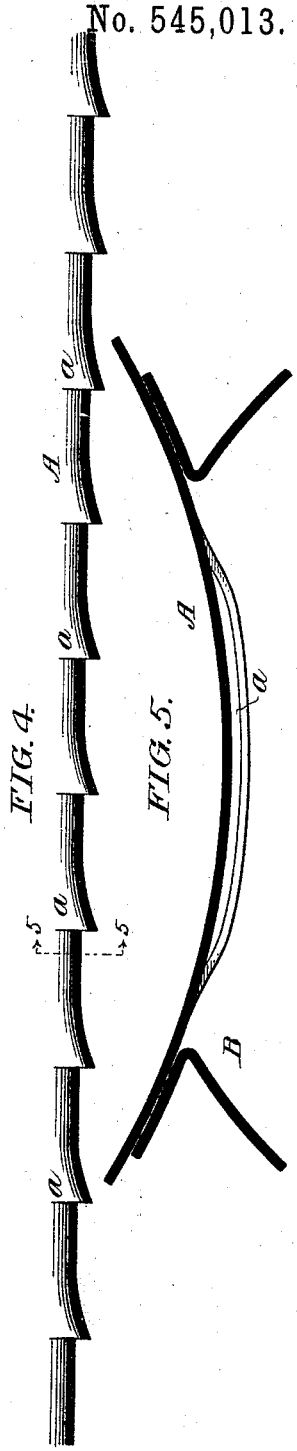
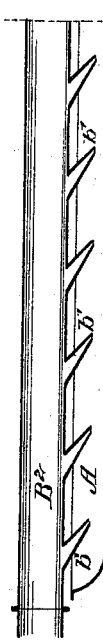
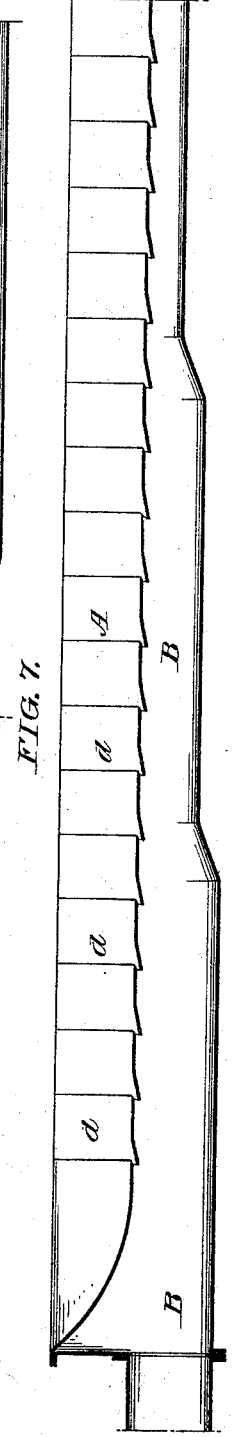
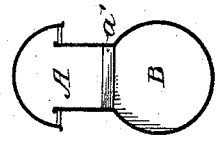
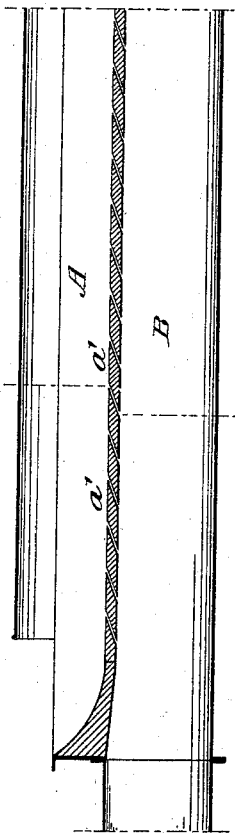
Witnesses:
Hamilton B. Turner.
H. D. Goodwin.
Inventor:
James M. Dodge
by his Attorneys
Howson & Howson

UNITED STATES PATENT OFFICE.

JAMES M. DODGE, OF PHILADELPHIA, PENNSYLVANIA, ASSIGNOR TO THE AIR CONVEYOR COMPANY, OF CAMDEN, NEW JERSEY, AND NICETOWN, PENNSYLVANIA.

PROCESS OF AND APPARATUS FOR CONVEYING MATERIALS.

SPECIFICATION forming part of Letters Patent No. 545,013, dated August 20, 1895.

Application filed June 26, 1895. Serial No. 554,118. (Model.)

*To all whom it may concern:*

Be it known that I, JAMES M. DODGE, a citizen of the United States, residing in Philadelphia, Pennsylvania, have invented certain Improvements in Processes of and Apparatus for Conveying Materials, of which the following is a specification.

My invention relates to improvements in the art of conveying materials, and more particularly of conveyance by impact of air or other fluid under pressure; and the objects of the invention are to minimize friction and wear and to effect the conveyance of material at a moderate expense of power by means of simple and durable apparatus applicable where other forms of conveyer cannot be used to advantage, if at all.

The invention consists in subjecting the materials to be conveyed, in an unconfined state, to the action, at successive stages in their path, of air or other fluid under pressure, in a manner substantially as hereinafter described, whereby said fluid exercises upon the material being conveyed a lifting or buoying action, and may at the same time, if desired, be made to propel the material.

The invention further consists in certain mechanism, hereinafter fully set forth, for carrying out my improved method of conveying materials.

In the accompanying drawings I have shown, and will now, to illustrate my invention, proceed to describe, one form of apparatus which I have used in carrying the invention into practice, and in which air, freely escaping from pressure, is caused to simultaneously propel by impact in an open conveyer in the desired direction and to tend to lift or buoy the material being conveyed. It will be apparent, however, that the invention may be carried out by means of many different forms of apparatus, and it will be understood that I do not in this application desire to confine myself to any particular form or construction of mechanism.

Figure 1 is a plan view of the apparatus; Fig. 2, a longitudinal view, partly in section; Fig. 3, a transverse sectional view on the line 3 3, Fig. 2; Fig. 4, a longitudinal sectional view, drawn to an enlarged scale, of a portion of the conveying bed or trough; Fig. 5, a transverse sectional view through the body of the trough or bed on the lines 5 5, Fig. 4; Fig. 6, a transverse sectional view of a modified form of conveying trough or bed; Fig. 7, a longitudinal sectional view showing a conveying trough or bed made of a series of underlying plates; Fig. 8, another modification illustrating a trough made of a series of overlapping plates; Fig. 9, a view showing a plain bed with a series of air-nozzles above the bed; Fig. 10, a view illustrating a conveying-trough provided with a hood or roof, and Fig. 11 a sectional view of the conveyer shown in Fig. 10.

Referring in the first instance to Figs. 1, 2, 3, 4, and 5, A is an open conveyer trough or bed, preferably concaved, as shown, and underneath this trough or bed is a conductor B for air under pressure. Air is forced through this conductor by means of an ordinary fan-blower B', and in the conductor is a valve $b$, by which this blast or current of air may be regulated.

At a suitable point above the conveyer bed or trough is a hopper C, to contain coal or other material to be conveyed, this hopper having a chute or pipe C', in which is a valve $c$, whereby the flow of material from the hopper to the trough may be regulated.

In the bottom of the trough A is a series of slots or perforations $a$, forming communications between the air-conductor B and the trough or bed A, so that air forced into the conductor in the direction of the arrow 1 will escape through said slots or perforations, as indicated by the arrows 2, and will act upon material on the trough or bed to impel it in the desired direction and at the same time tend to lift or buoy it.

The slots or perforations $a\,a$, which are more clearly shown in the enlarged views, Figs. 4 and 5, may be formed by simply making transverse slits in the bottom of the trough at suitable intervals and depressing the metal at one edge of these slits, thereby forming channels or passages $a'$, through which the fluid under pressure from the fluid-conductor B is forced out in the direction of the arrows.

The fluid-conductor B is in the present instance larger at the inlet end than at the opposite end.

I have obtained good results using apparatus such as above described, and having a conveying-trough one foot wide with slots in the bottom thereof three inches long, one inch apart, and presenting openings for the escape of air of a width of one-sixteenth of an inch at the widest point, and the motive-fluid conductor being one foot in diameter at the inlet end. With apparatus of these proportions about fifteen tons of material—such as pea coal—may be conveyed per hour with a working air-pressure of about two ounces. The conveying trough or bed being open, the air, after acting upon the materials to be conveyed, is free to escape and to reassume its normal condition. It will be understood, however, that to allow of this escape of the air after acting upon the material it is not essential that the trough or bed should be absolutely open. For example, the conveying trough or bed may, without materially interfering with the desired action, be provided with a roof or hood, as illustrated in Figs. 10 and 11, so as to prevent the escape over the sides of light materials and at the same time allowing for the free escape of air.

By means of apparatus such as above described material such as ashes or hard rock may be conveyed without undue wear of the conveying trough or bed, and in the conveyance of hot materials—such as ashes—the air-blasts will act to a certain extent to cool the material during its passage through the conveyer.

For the conveyance of delicate or friable materials my improved apparatus presents the advantage of reduced frictional contact between the conveyer and the materials being conveyed, which latter are therefore subjected during the conveyance to the least possible liability to be broken or otherwise injured.

My invention may be used to advantage for the conveyance of materials to places which would not be accessible, using any of the ordinary forms of mechanical conveyers known to me, and in the handling of materials such as coal the invention may be utilized to effect the automatic piling of the material at any desired point or points. For example, the coal may be carried to the end of the trough or bed and allowed to form a pile from that point outward by gravity, this pile being increased in length by simply increasing the strength of the air-blast and causing it to project the coal to a greater distance, and in this way a long pile may be made without adjustment of the trough or bed; or the reverse of this method may be employed, the coal being first piled at a given extreme point. This pile may be built inward by a gradual decrease of the air-blasts until the pile has reached the edge of the trough or bed.

The shape of the conveyer trough or bed and the character and angle of the slots or apertures therein may be varied in accordance with the varying characters of the materials to be conveyed and with the function or functions which it is desired that the air or other fluid under pressure shall perform.

In some cases the air or other fluid under pressure may be used simply for the purpose of exerting the lifting or buoying action upon the material being conveyed by other known means or processes—as, for example, by means of a screw conveyer—in which case the direction of the air blasts or currents will of course be such as to bring about simply this buoying or lifting action, or by a simple change in the direction of the air blasts or currents the latter may be caused to at once lift or buoy the material and at the same time act in conjunction with other means or power to impel it in the desired direction.

In Figs. 6 to 11 of the drawings various modifications in the construction and arrangement of the conveyer-bed and motive-fluid conductor are shown.

In Fig. 7 I have shown a conveyer-trough composed of a series of underlapping plates $d$, secured to the casing forming the air-conductor, and one or both edges of these plates may be tapered, as shown in said figure, the underlapping edge of each plate being bent down at the center, so as to clear the edge of the adjoining plate.

In Fig. 8 a series of plain plates $d'$, stepped so as to form outlets for the motive fluid, are shown.

In Fig. 9 I have illustrated a plain bed or trough with a motive-fluid conductor $B^2$ mounted above the bed and provided with a series of nozzles $b'$ so inclined as to direct a blast of air onto the bed. The air thus projected will pass under the material and buoy it and at the same time propel it forward.

In the device shown in Figs. 10 and 11 the conveyer-bed consists of a series of cast sections $a'$, separated by apertures whose edges are inclined so as to form inclined passages for the escape of the air, and the cast sections may be made so as to be adjustable toward or from each other, according to the character of material to be conveyed, or according as it may be desired to change the angle at which the motive fluid shall enter the trough or bed.

It will also be understood that instead of a fan-blower as herein illustrated and described various other known forms of blast apparatus or accumulators may be employed.

I claim as my invention—

1. As an improvement in the art of conveying material, which consists in feeding the material to the conveyer, leaving it unconfined and subjecting it, at successive intervals in its path, to the lifting or buoying action of air or other fluid escaping from pressure, substantially as described.

2. The process herein described of conveying material, said process consisting in feeding the material to the conveyer, leaving it unconfined and impelling the material by the impact of fluid escaping from pressure at successive intervals in its path, substantially as set forth.

3. The combination of an open conveyer bed, with a conductor for fluid under pressure, said conductor having a series of openings at different points along the bed so that the material will be impelled by the impact of fluid which freely escapes from the openings, substantially as described.

4. The combination in a conveyer, of the open bed having openings therein, a conductor for fluid under pressure extending along the bed and communicating with said openings so that the material will be impelled along the bed by the fluid which freely escapes through the openings, substantially as described.

5. The combination in a conveyer, of the open bed having a series of openings inclined in the direction of travel along the bed, a conductor for fluid under pressure communicating with said openings so that the material will be impelled along the bed by the impact of fluid which freely escapes from the openings, substantially as described.

6. The combination in a conveyer, of the open trough having a series of openings inclined in the direction of travel of the material along the trough, a conductor for fluid under pressure communicating with said openings so that the material will be impelled along the trough by the fluid which freely escapes from the openings, the conductor being larger at the inlet end than at the opposite end, substantially as described.

7. The combination in a conveyer, of a bed composed of one or more plates having slots therein, the plate at one side of each slot being depressed, with a conductor for air so arranged in respect to the bed that fluid under pressure in the conductor will escape through the openings in the bed, substantially as described.

8. The combination in a conveyer, of the trough, a conductor for fluid under pressure, said trough having passages therein communicating with the conductor, and a hood inclosing the trough, substantially as described.

9. As a means for conveying material, the combination of a conveyer bed having a series of openings along the length thereof, means for forcing fluid under pressure through said openings so that the fluid escaping from the openings will impel the material by impact along the conveyer, and means for regulating the pressure of such fluid so as to vary the blasts, whereby the length of the pile of material at the discharge end of the conveyer may be increased, substantially as described.

In testimony whereof I have signed my name to this specification in the presence of two subscribing witnesses.

JAMES M. DODGE.

Witnesses:
 WILL. A. BARR,
 JOS. H. KLEIN.